US012810056B2

(12) United States Patent
Park et al.

(10) Patent No.: US 12,810,056 B2
(45) Date of Patent: Nov. 24, 2026

(54) METHOD AND APPARATUS FOR PROVIDING A COMMENT INTERFACE TO ENCOURAGE WRITING HIGH-QUALITY COMMENTS

(71) Applicant: AJOU UNIVERSITY INDUSTRY-ACADEMIC COOPERATION FOUNDATION, Suwon-si (KR)

(72) Inventors: Inyoung Park, Seoul (KR); Tae-Sun Chung, Seongnam-si (KR)

(73) Assignee: AJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 402 days.

(21) Appl. No.: 18/363,622

(22) Filed: Aug. 1, 2023

(65) Prior Publication Data

US 2024/0152691 A1 May 9, 2024

(30) Foreign Application Priority Data

Nov. 3, 2022 (KR) ........................ 10-2022-0145257

(51) Int. Cl.
*G06F 40/169* (2020.01)
*G06F 3/0481* (2022.01)
(Continued)

(52) U.S. Cl.
CPC .......... *G06F 40/169* (2020.01); *G06F 3/0481* (2013.01); *G06F 3/04817* (2013.01); *G06F 3/0484* (2013.01)

(58) Field of Classification Search
None
See application file for complete search history.

(56) References Cited

U.S. PATENT DOCUMENTS 8,051,074 B2 * 11/2011 Eom .................. G06F 16/9535 707/732
8,793,255 B1 * 7/2014 Bilinski ........... G06Q 10/06393 707/740
(Continued)

FOREIGN PATENT DOCUMENTS

KR 10-2022-0000679 A 1/2022
KR 10-2352517 B1 1/2022
(Continued)

OTHER PUBLICATIONS

Inyoung Park, Daeho Lee & Young June Sah, Aug. 2022: "Under watching eyes in news comment sections: effects of audience cue on self-awareness and commenting behaviour," Behaviour & Information Technology.

*Primary Examiner* — Irete F Ehichioya
*Assistant Examiner* — Phoebe X Pan

(57) ABSTRACT

Disclosed herein a method and apparatus for providing a comment interface to encourage writing high-quality comments. The method includes: acquiring comment history information of a comment user who wants to enter a comment, based on user information of the comment user, determining a gaze effect of gazing the comment of the comment user among preset gaze effects based on the comment history information, and providing a comment interface including the determined gaze effect to the comment user.

18 Claims, 7 Drawing Sheets

(51) Int. Cl.
*G06F 3/04817* (2022.01)
*G06F 3/0484* (2022.01)

(56) References Cited

U.S. PATENT DOCUMENTS

| | | | | |
|---|---|---|---|---|
| 10,007,661 | B2 * | 6/2018 | Arquero | G06F 40/35 |
| 2009/0070376 | A1 * | 3/2009 | Eom | G06F 40/169 |
| 2013/0046756 | A1 * | 2/2013 | Hao | G06Q 30/0201 707/723 |
| 2013/0204992 | A1 * | 8/2013 | Kiris | H04L 67/535 709/223 |
| 2014/0156996 | A1 * | 6/2014 | Heppe | G06Q 30/00 713/168 |
| 2014/0215351 | A1 * | 7/2014 | Gansca | G06F 15/17306 715/751 |
| 2015/0149153 | A1 * | 5/2015 | Werth | G06F 40/30 704/9 |
| 2015/0193889 | A1 * | 7/2015 | Garg | G06Q 30/0251 705/14.49 |
| 2015/0222617 | A1 * | 8/2015 | Ebersman | G06F 40/30 726/4 |
| 2016/0379229 | A1 * | 12/2016 | Akkiraju | G06Q 30/0282 705/7.31 |
| 2017/0041263 | A1 * | 2/2017 | Shekel | H04L 51/04 |
| 2017/0195125 | A1 * | 7/2017 | Heppe | H04L 63/123 |
| 2017/0220535 | A1 * | 8/2017 | Olsen | G06F 40/166 |
| 2018/0046886 | A1 * | 2/2018 | Greenberger | G06Q 50/01 |
| 2018/0113863 | A1 * | 4/2018 | Kuznetsov | G06F 16/435 |
| 2018/0373697 | A1 * | 12/2018 | Jain | G06F 40/253 |
| 2019/0356956 | A1 * | 11/2019 | Sheng | H04N 21/4665 |
| 2020/0050306 | A1 * | 2/2020 | Tan | G06F 9/451 |
| 2020/0065376 | A1 * | 2/2020 | Deluca | H04L 51/046 |
| 2020/0081965 | A1 * | 3/2020 | Waters | G06F 40/30 |
| 2021/0374339 | A1 * | 12/2021 | Hira | H04N 21/26603 |
| 2022/0114679 | A1 * | 4/2022 | Lee | G06F 40/279 |

FOREIGN PATENT DOCUMENTS

| | | | | |
|---|---|---|---|---|
| KR | 10-2022-0045122 A | | 4/2022 | |
| KR | 10-2022-0097774 A | | 7/2022 | |
| WO | WO-2017144968 A1 | * | 8/2017 | G06F 16/9577 |

* cited by examiner

METHOD AND APPARATUS FOR PROVIDING A COMMENT INTERFACE TO ENCOURAGE WRITING HIGH-QUALITY COMMENTS

CROSS-REFERENCE TO RELATED APPLICATION

This application claims priority to and the benefit of Korean Patent Application No. 2022-0145257, filed on Nov. 3, 2022, the disclosure of which is incorporated herein by reference in its entirety.

BACKGROUND OF THE INVENTION

Field of the Invention

The present disclosure relates to a method and apparatus for providing a comment interface and, more particularly, to a method and apparatus for providing a comment interface capable of achieving quality improvement on comments of comment users and providing positive results by providing a comment interface including a gaze effect for encouraging to write high-quality comments.

DESCRIPTION OF THE RELATED ART

With the development of Internet and online news media, the commenting culture has been created in which a lot of people actively share their opinions about various interests and issues through comments on the web.

Comments are short pieces of replies to texts posted by some people on the Internet. Commenting has a positive function to create a hotbed of free debates. However, it also has a negative function to spread slander, hatred, derision, or false information by abusing anonymity.

SUMMARY

The present disclosure is technically directed to provide a method and apparatus for providing a comment interface capable of achieving quality improvement on comments of comment users and providing positive results by providing a comment interface including a gaze effect for encouraging to write high-quality comments.

The technical objects of the present disclosure are not limited to the above-mentioned technical objects, and other technical objects that are not mentioned will be clearly understood by those skilled in the art through the following descriptions.

According to the present disclosure, there is provided a method for providing a comment interface, the method including: acquiring comment history information of a comment user who wants to enter a comment, based on user information of the comment user; determining a gaze effect of gazing the comment of the comment user among preset gaze effects based on the comment history information; and providing a comment interface including the determined gaze effect to the comment user.

According to the embodiment of the present disclosure in the method, the determining may determine the gaze effect of gazing the comment of the comment user by reflecting statistical information on each of the gaze effects.

According to the embodiment of the present disclosure in the method, the comment history information may include at least one of comments of the comment user, a gaze effect of each of the comments, news or an article associated with each of the comments, the number of views for each of the comments, the number of likes for each of the comments, the number of dislikes for each of the comments, and the number of reports for each of the comments.

According to the embodiment of the present disclosure in the method, the determining may determine a first gaze effect, which is set to tempt from a negatively-oriented comment to a positively-oriented comment, among the gaze effects, based on the number of dislikes being equal to or greater than a first reference number, the number of reports being a second reference number, or the comment user being included in a blacklist.

According to the embodiment of the present disclosure in the method, the determining may determine the gaze effect of the comment user by reflecting a comment keyword and a gaze effect of another comment user who enters a comment on news or an article on which the comment user wants to enter a comment.

According to the embodiment of the present disclosure in the method, the method may further include extracting in real time a main keyword of a comment entered through the comment interface and changing the gaze effect in real time by reflecting the main keyword.

According to the embodiment of the present disclosure in the method, the changing may change at least one of a shape, a color, and a size of the gaze effect in real time by reflecting the main keyword.

According to the embodiment of the present disclosure in the method, the method may further include providing comment history information of a first comment user whom the comment user follows, when the first comment is selected by the comment user.

According to the embodiment of the present disclosure in the method, the gaze effect may include a watching-eye cue.

According to another embodiment of the present disclosure, there is provided a method for providing a comment interface, the method including: providing a comment interface including a preset initial gaze effect among preset gaze effects of gazing a comment of a comment user; extracting a comment content of the comment user through the comment interface; and changing the initial gaze effect to a gaze effect corresponding to the comment content in real time.

According to the embodiment of the present disclosure in the method, the providing of the comment interface may include acquiring comment history information of the comment user based on user information of the comment user; determining the initial gaze effect among the gaze effects based on the comment history information; and providing the comment interface including the determined initial gaze effect.

According to the embodiment of the present disclosure in the method, the changing may change in real time the initial gaze effect to a gaze effect corresponding to a main keyword of the comment content and statistical information according to the main keyword.

According to the embodiment of the present disclosure in the method, the extracting additionally may extract a main content of news or an article on which a comment is to be entered, and the changing may change in real time the initial gaze effect to a gaze effect corresponding to the comment content and the main content.

According to other embodiment of the present disclosure, there is provided an apparatus for providing a comment interface, the apparatus including: an acquisition unit configured to acquire comment history information of a comment user who wants to enter a comment, based on user information of the comment user; a determination unit configured to determine a gaze effect of gazing the comment of the comment user among preset gaze effects based on the comment history information; and a provision unit configured to provide a comment interface including the determined gaze effect to the comment user.

According to the embodiment of the present disclosure in the apparatus, the determination unit may determine the gaze effect of gazing the comment of the comment user by reflecting statistical information on each of the gaze effects.

According to the embodiment of the present disclosure in the apparatus, the comment history information may include at least one of comments of the comment user, a gaze effect of each of the comments, news or an article associated with each of the comments, the number of views for each of the comments, the number of likes for each of the comments, the number of dislikes for each of the comments, and the number of reports for each of the comments.

According to the embodiment of the present disclosure in the apparatus, the determination unit may determine the gaze effect of the comment user by reflecting a comment keyword and a gaze effect of another comment user who enters a comment on news or an article on which the comment user wants to enter a comment.

According to the embodiment of the present disclosure in the apparatus, the provision unit may extract in real time a main keyword of a comment entered through the comment interface and changes the gaze effect in real time by reflecting the main keyword.

According to the embodiment of the present disclosure in the apparatus, the provision unit may change at least one of a shape, a color, and a size of the gaze effect in real time.

According to the embodiment of the present disclosure in the apparatus, the provision unit may extract a main content of news or an article, on which the comment user wants to enter a comment, and changes the gaze effect in real time by additionally reflecting the main content.

The features briefly summarized above for this disclosure are only exemplary aspects of the detailed description of the disclosure which follow, and are not intended to limit the scope of the disclosure.

The technical problems solved by the present disclosure are not limited to the above technical problems and other technical problems which are not described herein will be clearly understood by a person (hereinafter referred to as an ordinary technician) having ordinary skill in the technical field, to which the present disclosure belongs, from the following description.

BRIEF DESCRIPTION OF THE DRAWINGS

FIG. 8 shows a configuration of an apparatus for providing a comment interface according to still another embodiment of the present disclosure.

DETAILED DESCRIPTION

Figure 1:
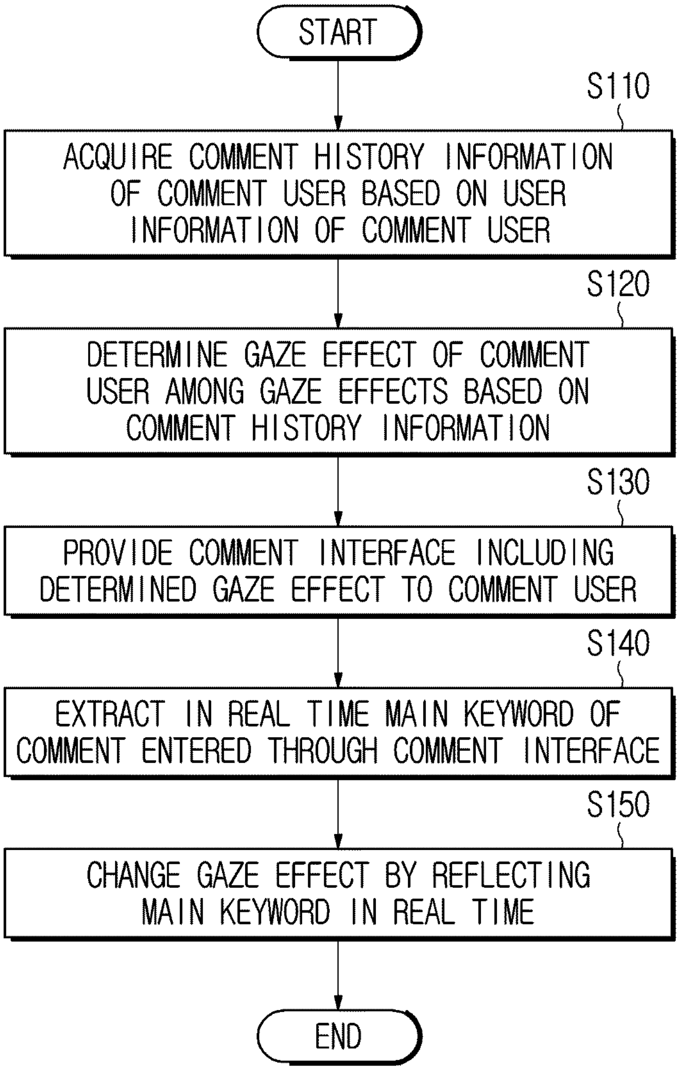
FIG. 1 shows an operation flowchart for a method of providing a comment interface according to one embodiment of the present disclosure.

Hereinafter, exemplary embodiments of the present disclosure will be described in detail with reference to the accompanying drawings so that those skilled in the art may easily implement the present disclosure. However, the present disclosure may be implemented in various different ways, and is not limited to the embodiments described therein.

In describing exemplary embodiments of the present disclosure, well-known functions or constructions will not be described in detail since they may unnecessarily obscure the understanding of the present disclosure. The same constituent elements in the drawings are denoted by the same reference numerals, and a repeated description of the same elements will be omitted.

In the present disclosure, when an element is simply referred to as being "connected to", "coupled to" or "linked to" another element, this may mean that an element is "directly connected to", "directly coupled to" or "directly linked to" another element or is connected to, coupled to or linked to another element with the other element intervening therebetween. In addition, when an element "includes" or "has" another element, this means that one element may further include another element without excluding another component unless specifically stated otherwise.

In the present disclosure, the terms first, second, etc. are only used to distinguish one element from another and do not limit the order or the degree of importance between the elements unless specifically mentioned. Accordingly, a first element in an embodiment could be termed a second element in another embodiment, and, similarly, a second element in an embodiment could be termed a first element in another embodiment, without departing from the scope of the present disclosure.

In the present disclosure, elements that are distinguished from each other are for clearly describing each feature, and do not necessarily mean that the elements are separated. That is, a plurality of elements may be integrated in one hardware or software unit, or one element may be distributed and formed in a plurality of hardware or software units. Therefore, even if not mentioned otherwise, such integrated or distributed embodiments are included in the scope of the present disclosure.

In the present disclosure, elements described in various embodiments do not necessarily mean essential elements, and some of them may be optional elements. Therefore, an embodiment composed of a subset of elements described in an embodiment is also included in the scope of the present disclosure. In addition, embodiments including other elements in addition to the elements described in the various embodiments are also included in the scope of the present disclosure.

The advantages and features of the present invention and the way of attaining them will become apparent with reference to embodiments described below in detail in conjunction with the accompanying drawings. Embodiments, however, may be embodied in many different forms and should not be constructed as being limited to example embodiments set forth herein. Rather, these embodiments are provided so that this disclosure will be complete and will fully convey the scope of the invention to those skilled in the art.

In the present disclosure, each of phrases such as "A or B", "at least one of A and B", "at least one of A or B", "A, B or C", "at least one of A, B and C", " " at Each of the phrases such as "at least one of A, B or C" and "at least one of A, B, C or combination thereof" may include any one or all possible combinations of the items listed together in the corresponding one of the phrases.

Hereinafter, embodiments of the present disclosure will be described with reference to the accompanying drawings.

In the 2000s, as some famous celebrities' suffering from malicious comments resulted in their suicides, the seriousness of malicious comments began to be highlighted as a dark side of the commenting culture, and the demand for improving the commenting culture is on the rise.

Malicious comments refer to behaviors of writing posts online that are likely to hurt others mentally. Malicious comments tend to be encouraged by the characteristics of online commenting such as anonymity, non-contactness, and collectivism.

Anonymity, which refers to concealing identity on the web, tends to encourage to freely spread insults, slanders, and groundless rumors through the Internet, and non-contactness, which discourages people from treating others as human beings in a contactless situation, is likely to encourage a person with propensity for violence to be more violent on the Internet.

Furthermore, as more and more people write similar malicious comments, collectivism makes them less conscientious about vicious posting.

Despite various attempts to reduce malicious comments, the problem of malicious commenting is not solved and is recognized as one of the most serious social problems to be addressed for the ever-growing online community.

Embodiments of the present disclosure are directed to achieve quality improvement on comments of comment users and provide positive results by providing a comment interface including a gaze effect for encouraging to write high-quality comments.

FIG. 1 shows an operation flowchart for a method of providing a comment interface according to one embodiment of the present disclosure.

Referring to FIG. 1, in the method of providing a comment interface according to one embodiment of the present disclosure, user information of a comment user, who wants to enter a comment on a page such as news, an article, a blog, an SNS, and the like enabling comments to be entered, is identified, and comment history information of the comment user is acquired based on the user information (S110).

Herein, the user information may be identified through login information, and the comment history information may include at least one of comments that the user entered concerning other pieces of news or articles, a gaze effect of each comment, news or articles associated with each comment, the number of hits for each comment, the number of likes of each comment, the number of dislikes of each comment, and the number of reports of each comment. According to situations, the comment history information may include information on another comment user whom the comment user followed regarding a comment.

In addition, a service according to the technology of the present disclosure may store such data in a database (DB) of a device or a server, and the DB is not restricted or limited to the above-described data and may store information associated with the technology, for example, gaze effects, statistical information on each of the gaze effects, blacklist information, and the like. Herein, the gaze effects may mean images, videos, emoticons and the like which can arouse the feeling of being together with other people who gaze and observe the comment user's comments, and watching-eye cues may be included as a gaze effect. In addition, gaze effects may include subdivided gaze effects according to positive degrees, subdivided gaze effects according to neural degrees, and subdivided gaze effects according to negative degrees, and such subdivisions of gaze effects may be determined by individuals or companies providing this technology.

When the comment user's comment history information is acquired at step S110, a gaze effect of the comment user is determined among preset gaze effects based on the acquired comment hi story information (S120).

Herein, at step S120, a score of the comment user may be calculated using data in the comment history information, and a gaze effect of the comment user may be determined by determining, according to the calculated score, whether the comment user is a negative comment user, a neutral comment user, or a positive comment user. According to an embodiment, at step S120, an impact score of a gaze effect on a comment of the comment user may be analyzed through a relationship between a main keyword of each comment included in the comment history information and the gaze effect, a final impact score may be calculated by applying a weight to the impact score over time, it may be determined thus whether the comment user is a negative comment user, a neutral comment user, or a positive comment user, and thus the gaze effect of the comment user may be determined.

According to an embodiment, at step S120, the comment user's gaze effect may be determined among gaze effects by considering the relationship between a main keyword of each comment included in the comment history information and a gaze effect and the number of like and dislikes for each comment. According to an embodiment, at step S120, when the number of dislikes is equal to or greater than a first reference number, the number of reports is a second reference number, or the comment user is included in a blacklist, a gaze effect, which is set to tempt from negatively-oriented comments to positively-oriented comments, may be determined as the comment user's gaze effect among gaze effects. According to an embodiment, at step S120, the comment user's gaze effect may be determined by reflecting statistical information of each gaze effect in the comment history information of the comment user. Herein, the statistical information of each gaze effect may be set through a lot of experimental data, and such statistical information may be updated by reflecting statistical information according to gaze effects that are determined for each comment user. According to an embodiment, at step S120, a gaze effect of a comment user may be determined by reflecting a gaze effect of each comment and a main keyword of comments, that is, comment keywords of other comment users who enter comments on news or articles on which the comment user wants to enter comments. In addition, in the method according to an embodiment of the present disclosure, a commenting propensity of a comment user, that is, a negative propensity, a positive propensity, or a neutral propensity may be determined using the comment user's comment history information, and a gaze effect of the comment user may also be determined by considering the comment user's propensity thus identified and additional information or supplementary information associated with the comment user.

When a gaze effect of a comment user is determined at step S120, a comment interface including the determined gaze effect may be provided to the comment user, the feeling of being with other people observing the comment user's comments may be given through the gaze effect, and thus the contents of comments may be influenced so as to encourage to write good-quality comments. Accordingly, the quality improvement of comments and positive results may be provided (S130).

Furthermore, the method according to an embodiment of the present disclosure is not restricted or limited to providing a comment interface including a gaze effect and, as at step S140, extract in real time a main keyword from comments entered by another comment user through the comment interface, and modify the gaze effect determined at step S120 by reflecting the main keyword thus extracted (S140, S150).

Figure 3:
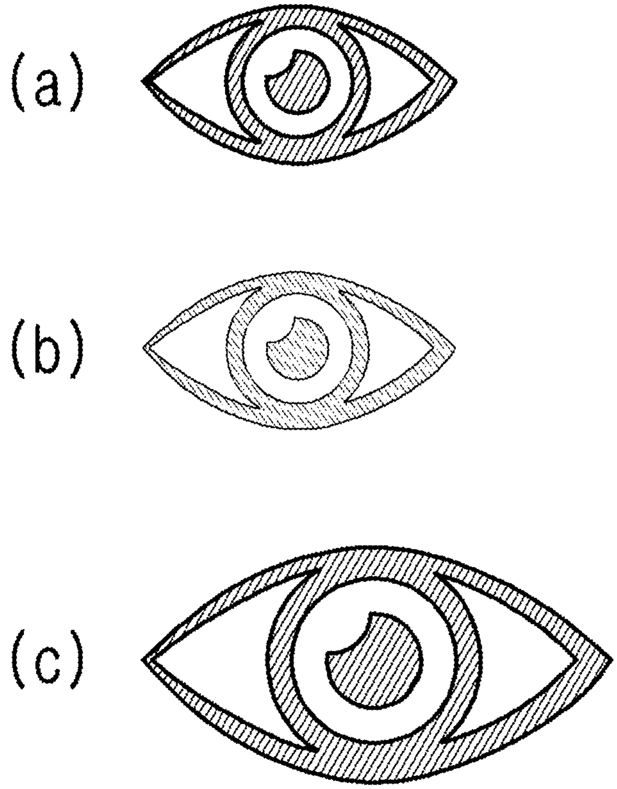
FIG. 3 is a view exemplifying changes in the color and size of a gaze effect.

Herein, at step S140, based on an extracted main keyword and a gaze effect of a comment user, at least one of the shape, color and size of a gaze effect determined at step S130 may be changed in real time, and the gaze effect determined at step S130 may be changed to another gaze effect in real time. When at least one of the shape, color and size of a gaze effect determined at step S130 is changed in real time, there may be two cases: in the first case, at least one of the shape, color and size of a gaze effect determined at step S130 among preset gaze effects may include a changed gaze effect and be changed to any one of the gaze effects in real time, and in the second case, at least one of a shape, a color, and a size may be directly changed for a gaze effect determined at step S130, and thus a gaze effect reflecting a main keyword may be changed in real time. For example, at step S140, as illustrated in FIG. 3, when a gaze effect determined at step S130 is as shown in (a) of FIG. 3, if a negative keyword is detected by extracting a main keyword of a comment entered in a comment box, the gaze effect may be expressed in another color (for example, red) as illustrated in (b) of FIG. 3, and if a negative keyword is continuously detected in this situation, the gaze effect of (a) of FIG. 3 may be changed and expressed in a predetermined size or larger as shown in (c) of FIG. 3, or the red gaze effect of (b) of FIG. 3 may be changed and expressed in a predetermined size or larger. That is, the method according to an embodiment of the present disclosure may determine and provide a gaze effect of a comment user through comment history information but is not limited thereto and change a gaze effect in real time to encourage a comment user to write a positive comment by detecting a main keyword (for example, a positive keyword or sentence, a negative keyword or sentence, or a neutral keyword or sentence) through comments that are entered in real time in a comment box. Of course, depending on a main keyword, a gaze effect may not be changed but remain the same.

The method according to an embodiment of the present disclosure will be described in further detail with reference to FIG. 2 below.

Figure 2:
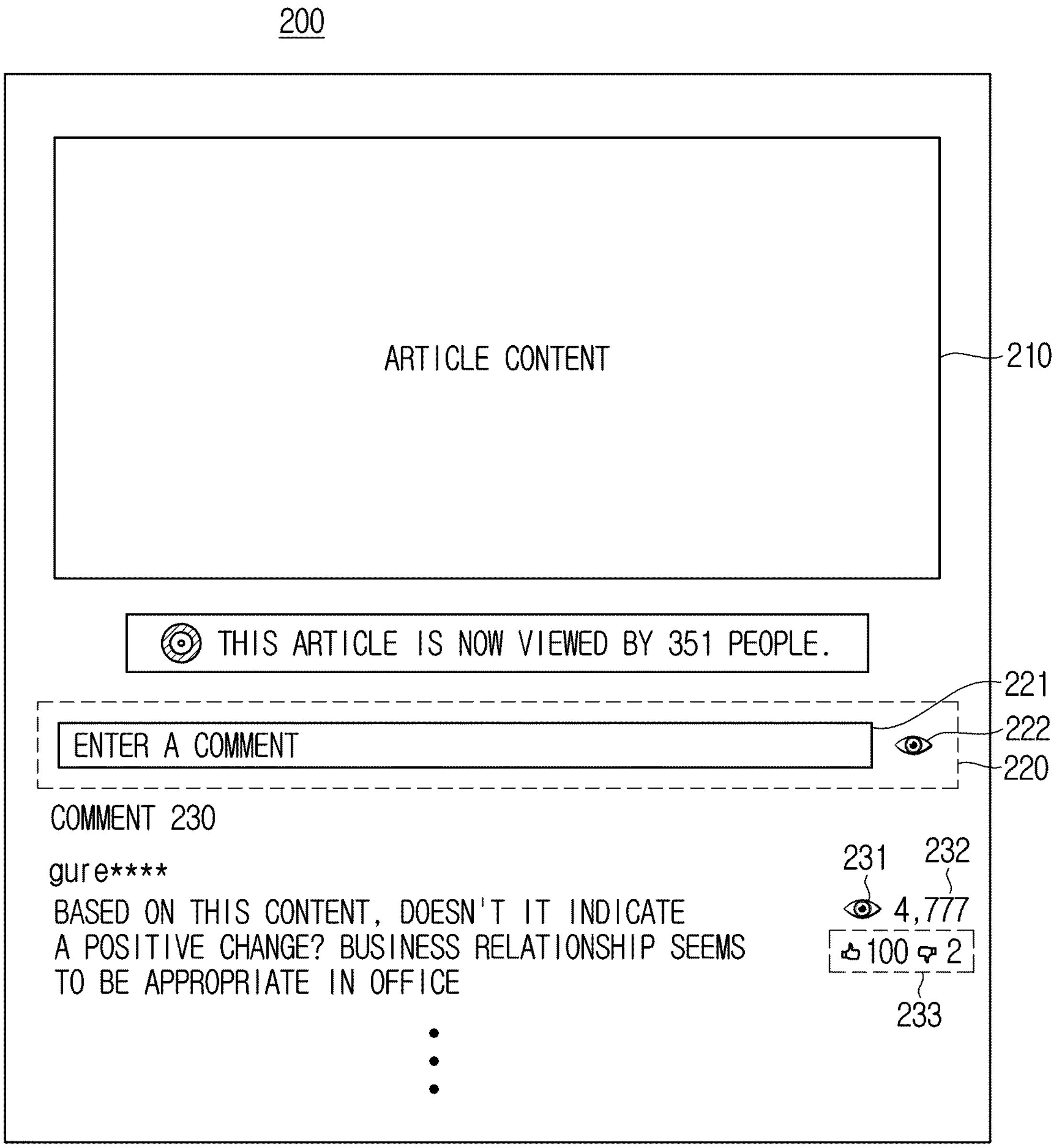
FIG. 2 shows an example view for explaining a comment interface of the present disclosure.

FIG. 2 shows an example view for explaining a comment interface of the present disclosure, and as illustrated in FIG. 2, a comment interface may be provided to enter a comment on an article content 210 on a page 200 of news or article, and a comment interface 220 may be provided to show a gaze effect 222 of a comment user determined by the method of the present disclosure, for example, a watching-eye cue next to a comment box 221. The page 200 providing an article content may include, as shown in FIG. 2, the comment interface 220 for entering a comment of a comment user, a comment of another user that is already entered, a gaze effect 231 of each comment, the number of views 232 of each comment, the number of likes and dislikes 233 of each comment, and the like. Herein, the gaze effect 231 displayed together with anther comment user's comment may be a gaze effect determined at step S130 of FIG. 1 or a gaze effect that is finally changed at step S150.

Figure 4:
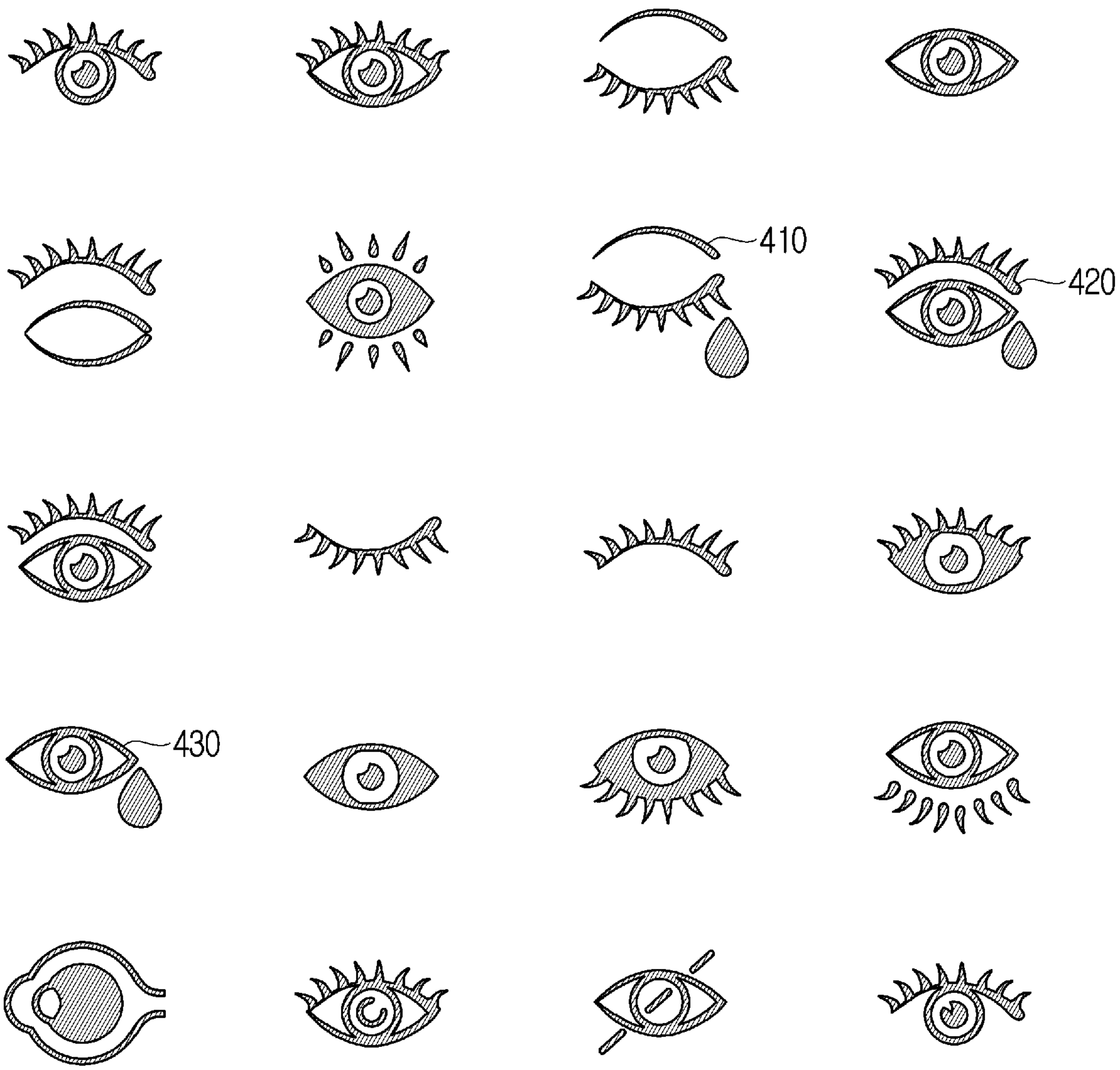
FIG. 4 is a view exemplifying gaze effects.

FIG. 4 is a view exemplifying gaze effects, and as illustrated in FIG. 4, various gaze effects such as images and emoticons capable of giving a comment user the feeling that other people are observing comments may be used, and not only an image associated with watching-eye but also various images or emoticons capable of giving the feeling of being observed may be used. Among the gaze effects of FIG. 4, gaze effects 410, 420 and 430 shedding tears may represent an example of a gaze effect that can be provided to a comment interface of a comment user entering a negative comment, and gaze effects may be set by being subdivided for positive, neutral and negative comments, based on statistical information on each of the gaze effects. Of course, a positive gaze effect, a neutral gaze effect, and a negative gaze effect are not restricted or limited to the above description, and gaze effects corresponding to positiveness, neutrality, and negativeness may be different according to situations, which may be determined by individuals or companies providing the technology of the present disclosure.

The above-described method according to an embodiment of the present disclosure determines and provides a gaze effect of a comment user based on comment history information of the comment user, and a method according to another embodiment of the present disclosure may apply a way of providing a preset initial gaze effect to a comment interface and then changing and providing in real time the gaze effect based on a comment content that is entered.

Figure 5:
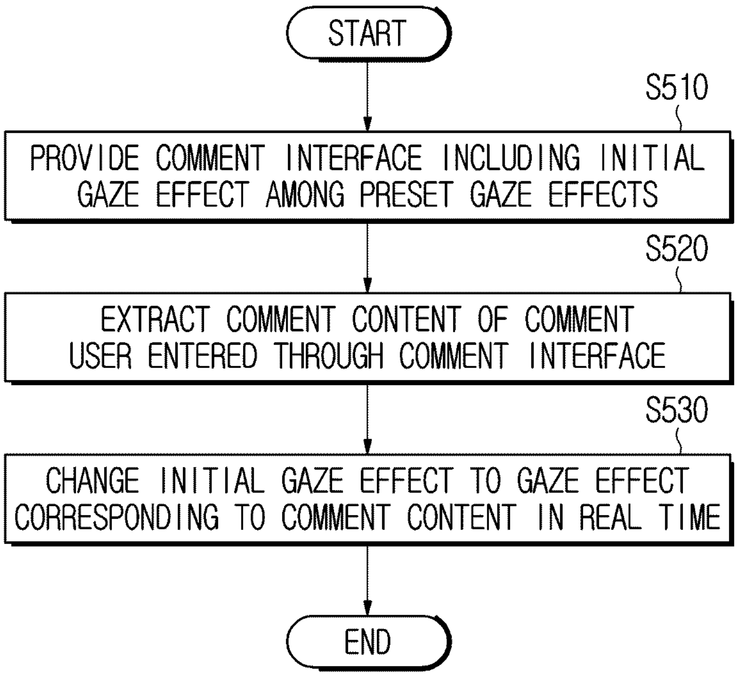
FIG. 5 shows an operation flowchart for a method of providing a comment interface according to another embodiment of the present disclosure.

FIG. 5 shows an operation flowchart for a method of providing a comment interface according to another embodiment of the present disclosure.

Figure 6:
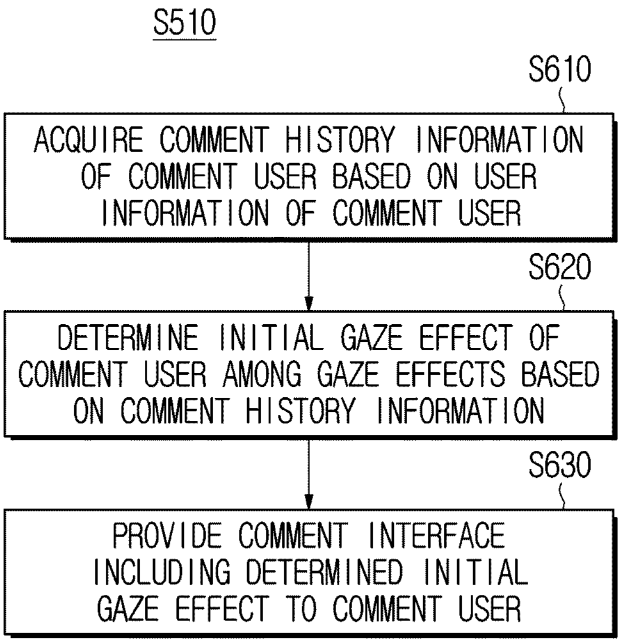
FIG. 6 shows an operation flowchart of one embodiment for step S510 of FIG. 5.

Referring to FIG. 5, in a method of providing a comment interface according to another embodiment of the present disclosure, among gaze effects, a preset initial gaze effect is provided to a comment interface of a comment user who wants to enter a comment on a page such as news, an article, a blog, an SNS, and the like enabling comments to be entered (S510). Herein, the initial gaze effect may be a gaze effect, which is already set irrespective of a comment user, or a gaze effect that is determined based on the comment user's comment history information. According to an embodiment, the providing of the comment interface including the initial gaze effect (S510) may, as illustrated in FIG. 6, acquire the comment user's comment history information based on user information of the comment user, determine the initial gaze effect among gaze effects based on the comment history information, and provide a comment interface including the initial gaze effect thus determined to the comment user (S610, S620, and S630). The above content of FIG. 6 may be applied in the same manner as the content described in FIG. 1.

When the comment interface including the initial gaze effect of step S510 has been provided, if the comment user enters a comment through the comment interface, a comment content or a main keyword is extracted by analyzing the entered comment in real time, and based on the extracted comment content, the initial gaze effect is changed to a gaze effect corresponding to the extracted comment content (S520 and S530).

Herein, at step S530, the gaze effect may be changed in real time by reflecting not only a main keyword of a comment but also a main content extracted from a content of an article, and the initial gaze effect may be changed to another gaze effect in real time based on the main keyword of the content of comment and statistical information according to the main keyword.

Figure 7:
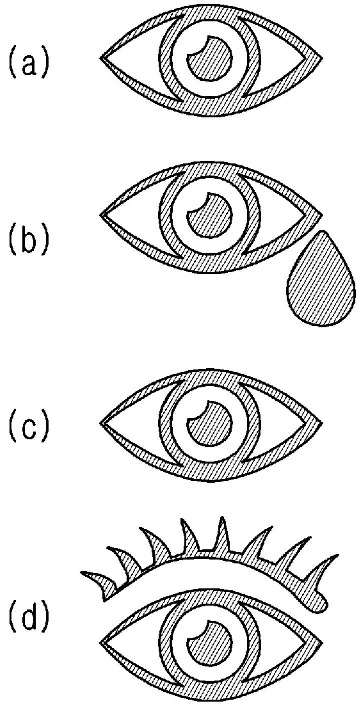
FIG. 7 is a view exemplifying a gaze effect changing in real time.

For example, at step S530, as illustrated in (a) of FIG. 7, when a preset initial gaze effect (for example, a neutral gaze effect) is provided, if an extracted content of a comment, for example, a main keyword is a negative keyword, the gaze effect is changed in real time to a gaze effect, as illustrated in (b) of FIG. 7, and is provided to tempt from a negative comment toward a positive comment, and if the content of the comment in this state is tempted to a neutral content as illustrated in (c) of FIG. 7, it may be changed to a neutral gaze effect (here, the neutral gaze effect may be the same as or partially different from (a) of FIG. 7) and be provided again, and if a positive keyword is extracted afterward, the gaze effect may be changed to a positive gaze effect in real time, as illustrated in (d) of FIG. 7, and be provide. Of course, in the method of the present disclosure, a way of analyzing main keywords in terms of negative keywords, neutral keywords, and positive keywords is obvious to those skilled in the art and thus a further detailed description thereof will be omitted, and the gaze effects illustrated in FIG. 7, which are provided according to extracted negative keywords, neutral keywords, and positive keywords respectively, are merely one embodiment, and gaze effects provided according to negative keywords, neutral keywords, and positive keywords respectively may be determined by individuals or companies that provide the technology of the present disclosure.

Thus, a method according to embodiments of the present disclosure may achieve quality improvement on comments of comment users and provide positive results by providing a comment interface including a gaze effect for encouraging to write high-quality comments.

Furthermore, a method according to embodiments of the present disclosure may provide comment history information of a first comment user, for example, news or articles information, a comment content of a corresponding article, a gaze effect of the article, and the like, when the first comment user who a comment user follows is selected by the comment user, and thus check comment contents and gaze effects in other news or articles of the first comment user.

FIG. 8 shows a configuration of an apparatus for providing a comment interface according to still another embodiment of the present disclosure, showing a conceptual configuration of an apparatus performing the method of FIG. 1 to FIG. 7.

Referring to FIG. 8, a comment interface provision apparatus 800 according to yet another embodiment of the present disclosure includes an acquisition unit 810, a determination unit 820, a provision unit 830, and a database (DB) 840.

The DB 840 is a means of storing data necessary to implement the apparatus of the present disclosure and may store user information of a comment user, comment history information of each comment user, information on other comment users whom each comment user follows, gaze effects, statistical information on each gaze effect, blacklist information, statistical information on each main keyword of comments, and the like. Of course, apart from the above-described data, the DB 840 may also store data necessary to implement the apparatus of the present disclosure.

The acquisition unit 810 acquires comment history information of a comment user based on user information of the comment user who wants to enter a comment.

Herein, the user information may be identified through login information, and the comment history information may include at least one of comments that the user entered concerning other pieces of news or articles, a gaze effect of each comment, news or articles associated with each comment, the number of hits for each comment, the number of likes of each comment, the number of dislikes of each comment, and the number of reports of each comment. According to situations, the comment history information may include information on another comment user whom the comment user followed regarding a comment.

The determination unit 820 determines a gaze effect of gazing the comment user's comment among preset gaze effects based on the comment history information.

According to an embodiment, the determination unit 820 may calculate a score of the comment user by using data in the comment history information and determine a gaze effect of the comment user by determining, according to the calculated score, whether the comment user is a negative comment user, a neutral comment user, or a positive comment user.

According to an embodiment, the determination unit 820 may analyze an impact score of a gaze effect on a comment of the comment user through a relationship between a main keyword of each comment included in the comment history information and the gaze effect, calculate a final impact score by applying a weight to the impact score over time, determine thus whether the comment user is a negative comment user, a neutral comment user, or a positive comment user, and thus determine the gaze effect of the comment user.

According to an embodiment, the determination unit 820 may determine a gaze effect of a comment user among gaze effects by considering the relationship between a main keyword of each comment included in the comment history information and a gaze effect and the number of like and dislikes for each comment.

According to an embodiment, the determination unit 820 may determine a gaze effect, which is set to tempt from negatively-oriented comments to positively-oriented comments, as the comment user's gaze effect among gaze effects, when the number of dislikes is equal to or greater than a first reference number, the number of reports is a second reference number, or the comment user is included in a blacklist.

According to an embodiment, the determination unit 820 may determine a gaze effect of a comment user also by reflecting statistical information of each gaze effect in the comment history information of the comment user.

According to an embodiment, the determination unit 820 may determine a gaze effect of a comment user by reflecting a gaze effect of each comment and a main keyword of comments, that is, comment keywords of other comment users who enter comments on news or articles on which the comment user wants to enter comments.

The provision unit 830 provides a comment interface including a determined gaze effect to a comment user.

Furthermore, the provision unit 830 may extract a main keyword from a comment, which is entered by a comment user, through a comment interface and change a gaze effect in real time by reflecting the extracted main keyword.

Herein, based on an extracted main keyword and a gaze effect of a comment user, the provision unit 820 may change in real time at least one of the shape, color and size of a gaze effect determined by the determined unit 820 and change in real time the gaze effect determined by the determination unit 820 to another gaze effect.

Although not described in the apparatus of the present apparatus, an apparatus according to an embodiment of the present disclosure may include all the contents described in the method of FIG. 1 to FIG. 7, which is obvious to those skilled in the art.

Figure 9:
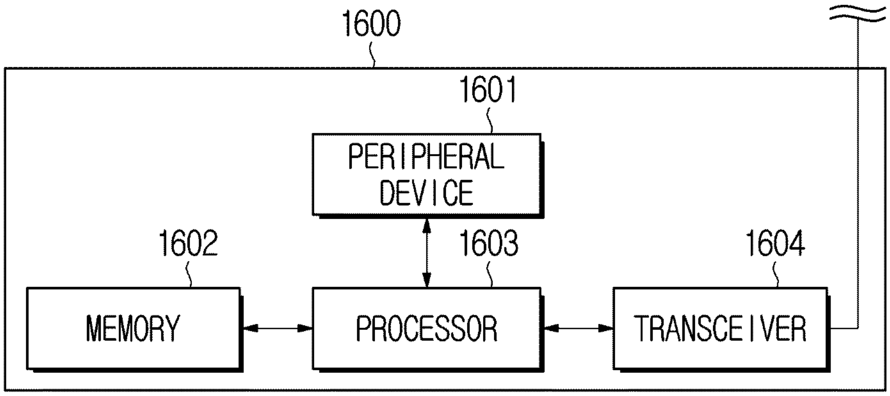
FIG. 9 shows a configuration of a device to which an apparatus for providing a comment interface according to yet another embodiment of the present disclosure is applied.

FIG. 9 shows a configuration of a device to which an apparatus for providing a comment interface according to yet another embodiment of the present disclosure is applied.

For example, the apparatus for the apparatus for providing a comment interface according to another embodiment of the present disclosure in FIG. 8 may be the device 1600 of FIG. 9.

Referring to FIG. 9, the device 1600 may include a memory 1602, a processor 1603, a transceiver 1604 and a peripheral device 1601. In addition, for example, the device 1600 may further include another configuration and is not limited to the above-described embodiment.

In this case, the device 1600 may be, for example, a mobile user terminal (e.g., smartphone, laptop, wearable device, etc.) or a stationary management device (e.g., server, PC, etc.).

More specifically, the device 1600 may be an exemplary hardware/software architecture such as apparatus for analyzing the comment, system for servicing the comment. Herein, as an example, the memory 1602 may be a non-removable memory or a removable memory. In addition, as an example, the peripheral device 1601 may include a display, GPS or other peripherals and is not limited to the above-described embodiment.

In addition, as an example, the above-described device 1600 may include a communication circuit like the transceiver 1604. Based on this, the device 1600 may perform communication with an external device.

In addition, as an example, the processor 1603 may be at least one of a general-purpose processor, a digital signal processor (DSP), a DSP core, a controller, a micro controller, application specific integrated circuits (ASICs), field programmable gate array (FPGA) circuits, any other type of integrated circuit (IC), and one or more microprocessors related to a state machine. In other words, it may be a hardware/software configuration playing a controlling role for controlling the above-described device 1600. Also, the processor 1603 may modularly perform the functions of the acquisition unit 810, the determination unit 820 and the provision unit 830 as shown in FIG. 8.

Herein, the processor 1603 may execute computer-executable commands stored in the memory 1602 in order to implement various necessary functions of the apparatus for providing a comment interface. As an example, the processor 1603 may control at least any one operation among signal coding, data processing, power controlling, input and output processing, and communication operation. In addition, the processor 1603 may control a physical layer, an MAC layer and an application layer. In addition, as an example, the processor 1603 may execute an authentication and security procedure in an access layer and/or an application layer but is not limited to the above-described embodiment.

In addition, as an example, the processor 1603 may perform communication with other devices via the transceiver 1604. As an example, the processor 1603 may execute computer-executable commands so that the apparatus for providing a comment interface may be controlled to perform communication with other devices via a network. That is, communication performed in the present invention may be controlled. As an example, the transceiver 1604 may send a RF signal through an antenna and may send a signal based on various communication networks.

In addition, as an example, MIMO technology and beam forming technology may be applied as antenna technology but are not limited to the above-described embodiment. In addition, a signal transmitted and received through the transceiver 1604 may be controlled by the processor 1603 by being modulated and demodulated, which is not limited to the above-described embodiment.

According to the present disclosure, it is possible to provide a method and apparatus for providing a comment interface capable of achieving quality improvement on comments of comment users and providing positive results by providing a comment interface including a gaze effect for encouraging to write high-quality comments.

Effects obtained in the present disclosure are not limited to the above-mentioned effects, and other effects not mentioned above may be clearly understood by those skilled in the art from the above description.

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some of the steps.

The various embodiments of the present disclosure are not a list of all possible combinations and are intended to describe representative aspects of the present disclosure, and the matters described in the various embodiments may be applied independently or in combination of two or more.

In addition, various embodiments of the present disclosure may be implemented in hardware, firmware, software, or a combination thereof. In the case of implementing the present invention by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

What is claimed is:

1. A method for providing a comment interface, the method comprising:

acquiring comment history information of a comment user who wants to enter a comment, based on user information of the comment user;

determining a gaze effect of gazing the comment of the comment user among preset gaze effects based on the comment history information;

providing the comment interface including the determined gaze effect to the comment user; and extracting in real time a main keyword of the comment entered through the comment interface and changing the gaze effect in real time by reflecting the main keyword, wherein the determined gaze effect is determined based on an impact score determined by a relationship, included in the comment history information, between a main keyword of each comment included in the comment history information and a gaze effect on the each comment, the impact score indicating an impact of the gaze effect on the each comment of the comment user, wherein the impact score is determined by applying weight, indicating impact of the gaze effect on the each comment of the comment user over time, to the impact score, and wherein the determining further comprises determining, based on the impact score, whether the comment user is a negative comment user, a neutral comment user, or a positive comment user, and determining, among the preset gaze effects, the gaze effect corresponding to the determined comment user.

2. The method of claim 1, wherein the determining determines the gaze effect of gazing the comment of the comment user by reflecting statistical information on each of gaze effects of the comment history information.

3. The method of claim 1, wherein the comment history information includes at least one of comments of the comment user, the gaze effect of each of the comments, news or an article associated with each of the comments, a number of views for each of the comments, a number of likes for each of the comments, a number of dislikes for each of the comments, and a number of reports for each of the comments.

4. The method of claim 3, wherein the determining determines a first gaze effect, which is set to tempt from a negatively-oriented comment to a positively-oriented comment, based on the number of dislikes being equal to or greater than a first reference number, the number of reports being a second reference number, or the comment user being included in a blacklist.

5. The method of claim 1, wherein the determining determines the gaze effect of the comment user by reflecting a comment keyword and a gaze effect of another comment user who enters a comment on news or an article on which the comment user wants to enter a comment.

6. The method of claim 1, wherein the changing changes at least one of a shape, a color, and a size of the gaze effect in real time by reflecting the main keyword.

7. The method of claim 1, further comprising providing comment history information of a first comment user whom the comment user follows, when a first comment made by the first comment user is selected by the comment user.

8. The method of claim 1, wherein the gaze effect includes a watching-eye cue.

9. A method for providing a comment interface, the method comprising:

acquiring comment history information of a comment user based on user information of the comment user;

providing the comment interface including a preset initial gaze effect among preset gaze effects of gazing a comment of the comment user;

extracting in real time a comment content including a main keyboard of the comment entered by the comment user through the comment interface; and changing the preset initial gaze effect to a gaze effect corresponding to the comment content in real time, wherein the preset initial gaze effect is determined based on an impact score determined by a relationship, included in the comment history information, between a main keyword of each comment included in the comment history information and a gaze effect of the each comment, the impact score indicating an impact of the gaze effect on the each comment of the comment of the comment user, wherein the impact score is determined by applying weight, indicating impact of the gaze effect on the each comment of the comment user over time, to the impact score, and wherein the preset initial gaze effect is further determined by, based on the impact score, whether the comment user is a negative comment user, a neutral comment user, or a positive comment user, and setting the preset initial gaze effect corresponding to the determined comment user.

10. The method of claim 9, wherein the providing of the comment interface comprises:

determining the preset initial gaze effect among the gaze effects based on the comment history information; and providing the comment interface including the determined preset initial gaze effect.

11. The method of claim 9, wherein the changing changes in real time the preset initial gaze effect to a gaze effect corresponding to the main keyword of the comment content and statistical information according to the main keyword.

12. The method of claim 9, wherein the extracting additionally extracts a main content of news or an article on which the comment was entered, and the changing changes in real time the preset initial gaze effect to a gaze effect corresponding to the comment content and the main content.

13. An apparatus for providing a comment interface, the apparatus comprising:

an acquisition unit configured to acquire comment history information of a comment user who wants to enter a comment, based on user information of the comment user;

a determination unit configured to determine a gaze effect of gazing the comment of the comment user among preset gaze effects based on the comment history information; and a provision unit configured to provide the comment interface including the determined gaze effect to the comment user, wherein the determined gaze effect is determined based on an impact score determined by a relationship, included in the comment history information, between a main keyword of each comment included in the comment history information and a gaze effect on the each comment, the impact core indicating an impact of the gaze effect on the each comment of the comment user, wherein the impact score is determined by applying weight, indicating impact of the gaze effect on the each comment of the comment user over time, to the impact score, wherein the determination unit is further configured to determine, based on the impact score, whether the comment user is a negative comment user, a neutral comment user, or a positive comment user, and to determine, among the preset gaze effects, the determined gaze effect corresponding to the determined comment user, and wherein the provision unit is further configured to extract in real time a main keyword of the comment entered through the comment interface and changes the determined gaze effect in real time by reflecting the main keyword.

14. The apparatus of claim 13, wherein the determination unit determines the gaze effect of gazing the comment of the comment user by reflecting statistical information on each of gaze effects of the comment history information.

15. The apparatus of claim 13, wherein the comment history information includes at least one of comments of the comment user, the gaze effect of each of the comments, news or an article associated with each of the comments, a number of views for each of the comments, a number of likes for each of the comments, a number of dislikes for each of the comments, and a number of reports for each of the comments.

16. The apparatus of claim 13, wherein the determination unit determines the gaze effect of the comment user by reflecting a comment keyword and a gaze effect of another comment user who enters a comment on news or an article on which the comment user wants to enter a comment.

17. The apparatus of claim 13, wherein the provision unit changes at least one of a shape, a color, and a size of the gaze effect in real time.

18. The apparatus of claim 13, wherein the provision unit extracts a main content of news or an article, on which the comment user entered the comment, and changes the gaze effect in real time by additionally reflecting the main content.

* * * * *